(12) United States Patent
Lim et al.

(10) Patent No.: US 8,291,946 B2
(45) Date of Patent: Oct. 23, 2012

(54) APPARATUS FOR SENSING FUEL LEVEL IN FUEL TANK

(75) Inventors: JongKeun Lim, Cheongju-si (KR); Youngchang Kim, Cheongju-si (KR); Inseok Sohn, Cheongju-si (KR); Kyuseob Shin, Daejeon (KR); Joonseup Kim, Daejeon (KR); Munsik Jeon, Cheongju-si (KR)

(73) Assignee: Coavis (KR)

( * ) Notice: Subject to any disclaimer, the term of this patent is extended or adjusted under 35 U.S.C. 154(b) by 0 days.

(21) Appl. No.: 13/211,395

(22) Filed: Aug. 17, 2011

(65) Prior Publication Data
US 2012/0060974 A1  Mar. 15, 2012

(30) Foreign Application Priority Data
Sep. 14, 2010  (KR) .................. 10-2010-0089844

(51) Int. Cl.
*B65B 3/04*    (2006.01)
*G01F 23/32*   (2006.01)
*G01F 23/56*   (2006.01)

(52) U.S. Cl. .............. 141/198; 141/95; 73/305; 73/313; 73/317

(58) Field of Classification Search .................. 141/85, 141/94–95, 100, 198, 192; 137/558; 73/290 R, 73/305, 313, 317
See application file for complete search history.

(56) References Cited

U.S. PATENT DOCUMENTS

| | | | |
|---|---|---|---|
| 4,167,726 A | 9/1979 | Ezekiel | |
| 4,229,973 A | 10/1980 | Hara | |
| 6,851,315 B2 * | 2/2005 | Bergsma et al. | 73/317 |
| 6,868,724 B2 * | 3/2005 | Brzozowski et al. | 73/317 |
| 2010/0132456 A1 * | 6/2010 | Lee | 73/313 |
| 2011/0041600 A1 * | 2/2011 | Porras et al. | 73/299 |

FOREIGN PATENT DOCUMENTS

| | | |
|---|---|---|
| DE | 653785 | 12/1937 |
| DE | 1126967 | 4/1962 |
| DE | 3627116 | 2/1988 |
| DE | 3823884 | 1/1990 |
| DE | 102008002226 | 1/2009 |
| DE | 102008001207 | 10/2009 |
| KR | 10-2006-0130832 | 12/2006 |
| KR | 1020060130832 | 12/2006 |
| WO | 2006132494 | 12/2006 |
| WO | WO 2006132494 A1 * | 12/2006 |

OTHER PUBLICATIONS

German Office Action—German Application No. 102011113449.6 issued on Apr. 11, 2012, citing DE102008001207, DE102008002226, KR1020060130832, KR100712605, DE3627116, WO2006132494, US4229973, US4167726, DE653785, DE1126967, and DE3823884.

* cited by examiner

*Primary Examiner* — Timothy L Maust
*Assistant Examiner* — Timothy Kelly
(74) *Attorney, Agent, or Firm* — Cantor Colburn LLP

(57) ABSTRACT

Provided is an apparatus for sensing a fuel level in a fuel tank for sensing an amount of fuel remaining in the fuel tank mounted in a vehicle. The apparatus for sensing a fuel level according to the present invention senses a residual amount of fuel in a fuel tank by contacting a resistance substrate with a wiper, the apparatus including: a case that forms a sealable filling solution filling space and has a filling solution inlet formed on a top thereof; a stopper that blocks the filling solution inlet formed in the case to seal the filling solution filling space; and a filling solution that is filled in the filling solution filling space to perform an anti-rusting and lubricating function, wherein the resistance substrate and the wiper are disposed in the filling solution filling space.

7 Claims, 11 Drawing Sheets

APPARATUS FOR SENSING FUEL LEVEL IN FUEL TANK

CROSS-REFERENCE TO RELATED APPLICATIONS

This application claims priority under 35 U.S.C. §119 to Korean Patent Application No. 10-2010-0089844, filed on Sep. 14, 2011, in the Korean Intellectual Property Office, the disclosure of which is incorporated herein by reference in its entirety.

TECHNICAL FIELD

The present invention relates to an apparatus for sensing a fuel level in a fuel tank capable of sensing an amount of fuel remaining in the fuel tank mounted in a vehicle.

BACKGROUND

Generally, a fuel tank capable of accommodating fuel required to operate an engine is mounted in a vehicle and an apparatus for sensing a fuel level capable of sensing a residual amount of fuel is mounted in a fuel tank accommodating liquid fuel so as to inform a driver of the residual amount of fuel.

The apparatus for sensing a fuel level in a fuel tank is classified into a mechanical apparatus for sensing a fuel level and an electronic apparatus for sensing a fuel level.

The mechanical apparatus for sensing a fuel level senses a fuel level by changing a resistance value according to a change in a height of a floater floating in liquid fuel, which has been most prevalently used due to being a low price.

The electronic apparatus for sensing a fuel level directly senses a height of liquid fuel without separate floater.

FIG. 1 shows a mechanical apparatus for sensing a fuel level according to the related art.

The mechanical apparatus for sensing a fuel level according to the related art has a case 1 as shown in FIG. 1.

Further, the mechanical apparatus for sensing a fuel level includes a resistance substrate 2 that is mounted in the case 1 and radially formed within a predetermined angle range.

In addition, the mechanical apparatus for sensing a fuel level includes an arm 3 of which one side is fixed with a floater 3a and the other side is rotatably supported to the case 1.

Further, the mechanical apparatus for sensing a fuel level includes a wiper 4 that rotates together with the arm 3 while being fixed to the arm 3 and contacts the resistance substrate 2.

The case 1 and the resistance substrate 2 disposed therein are fixed to the fuel tank and the arm 3 and the wiper 4 rotates together by moving the floater 3a upward or downward according to the amount of fuel.

Therefore, a contact projection 4a of the wiper contacts different positions of the resistance substrate 2 while rotating within a predetermined angle range in a state in which the contact projection 4a contacts a radiation circuit 2a of the resistance substrate 2.

As a result, the resistance substrate 2 variably shows a resistance value according to the residual amount of fuel, thereby displaying the residual amount of fuel on an instrument panel of a vehicle.

As shown in FIG. 2, the apparatus for sensing a fuel level is generally mounted in a fuel pump module 5 to be mounted in the fuel tank.

However, the apparatus for sensing a fuel level in a fuel tank according to the related art has a problem in that the resistance substrate and the wiper showing different resistance values due to a contact thereof may be rapidly corroded due to a contact portion thereof always exposed to fuel or air and may have reduced durability due to abrasion caused by a continuous contact between the resistance substrate and the wiper.

These problems may lead to situations where the residual amount of fuel is not accurately sensed.

Recently, bio fuel, or the like, has been developed. When the bio fuel is used, the corrosion and abrasion may be more rapidly progressed.

As an apparatus for sensing a fuel level so as to solve these problems, there is a "Device for sensing fuel level for fuel tank of vehicle" filed by the applicant of the present invention and registered as Korean Patent No. 0712605.

The technology prevents the resistance substrate or the wiper from contacting with the fuel in the fuel tank and from being abraded due to the friction of the resistance substrate and the wiper by injecting and sealing a lubricant solution and an anti-rusting solution (hereinafter, referred to as "filling solution") into a space in which the resistance substrate and the wiper are disposed.

However, the related art may cause situations where the space in which the filing liquid is filled is not in a completely sealed state and the filling solution is frequently leaked from a point (bottom point), which is a gap that prevents the sealing state, such that the filling solution may not demonstrate its own function.

Despite of the above-mentioned problems, it is difficult to confirm the sealing state. As a result, defective products may be delivered and economic losses may be caused due to the delivery of defective products.

Meanwhile, in the case of the apparatus for sensing a fuel level using the above-mentioned filling solution, there is a problem in that the residual amount of fuel may not be smoothly sensed under a low temperature condition of about 30° C. below zero due to low temperature characteristics of the filling solution (see FIG. 5).

Further, the apparatus for sensing a fuel level in a fuel tank having a floater according to the related art, even though the residual amount of fuel is a reference value or more or a reference value or less, the arm rotates within a set range.

The reason is that when the wiper connected to a shaft rotates above the set range, failure may occur.

In particular, when the arm rotates so that the floater may contact the bottom surface of the fuel tank, such that the residual amount of fuel is not smoothly sensed and noise may occur due to a collision of the floater with the bottom surface of the fuel tank at the time a vehicle is traveling.

The method of rotating the arm only within the set range of the related art prevents the arm 3 from rotating above the predetermined angle by contacting a wiper fixture 6 rotating together with the arm 3 while being fixed to the arm 3 with the case 1 forming the space in which the filling solution is filled, as shown in FIG. 3.

That is, when the wiper fixture 6 contacts a first rotation prevention part 1a or a second rotation prevention part 1b of the case 1, the arm 3 no longer rotates, such that the arm rotates only within the space range between the first rotation prevention part 1a and the second rotation prevention part 1b.

However, deviations in the size of the wiper fixture and the case may occur since the wiper fixture 6 and the case 1 are manufactured by an injection molding, such that the case in which the arm 3 exceedingly rotates may often occur.

SUMMARY

An embodiment of the present invention is directed to provide a structure of an apparatus for sensing a fuel level in a fuel tank capable of preventing an abrasion phenomenon and a corrosion phenomenon due to a friction of a resistance substrate and a wiper by a filling solution and lowering a defective rate by easily confirming a sealing state of a filling solution filling space.

Further, another embodiment of the present invention is directed to provide an apparatus for sensing a fuel level in a fuel tank capable of preventing an abrasion phenomenon and a corrosion phenomenon even though fuel in the fuel tank is introduced into a filling solution filling space.

In addition, an embodiment of the present invention is directed to smoothly sense a residual amount of fuel even at low temperature of about 30° C. below zero.

Moreover, an embodiment of the present invention is directed to provide an apparatus for sensing a fuel level in a fuel tank having a structure capable of lowering a defective rate caused by a function of rotating an arm only within a set range even though a residual amount of fuel is a reference value or more or a reference value or less.

In one general aspect, a resistance substrate and a wiper are disposed in a space in which a filling solution having an anti-rusting and lubricating function is filled to prevent an abrasion phenomenon and a corrosion phenomenon due to a friction of the resistance substrate and the wiper by the filling solution and forms a filling solution inlet on a top of the case so as to inject the filling solution into a sealable filling solution filling space to easily confirm whether the filling solution filling space is sealed through the filling solution inlet, thereby lowering a defective rate.

The apparatus for sensing a fuel level according to the present invention may have the case provided with the sealable filling solution filling space and having the filling solution inlet formed on the top thereof.

Further, the present invention may have a stopper that blocks the filling solution inlet formed in the case to seal the filling solution filling space.

Further, the present invention may have a liquid (filling solution) filled in the filling solution filling space to perform the anti-rusting and lubricating function.

Further, the resistance substrate and the wiper may be disposed in the filling solution filling space.

The present invention may prevent the abrasion phenomenon and the corrosion phenomenon even though the fuel in the fuel tank is introduced into the filling solution filling space when the filling solution is disposed at a position lower than the fuel in the fuel tank without mixing with the fuel in the fuel tank when the filling solution and the fuel in the fuel tank are disposed in the same space.

Further, the present invention may use the filling solution that does not form an oil film between the resistance substrate and the wiper under the condition of about 30° C. below zero, thereby smoothly sensing the reaming amount of fuel even at low temperature of about 30° C. below zero.

Further, the apparatus for sensing a fuel level may include a floater floating the fuel in the fuel tank and an arm connected to the floater and made of a metal material rotating the wiper while rotating according to a movement of the floater, wherein the arm rotates only within a set angle range and the arm rotates only within the set angle range by hanging the arm of the metal material onto the case to prevent the arm from rotating when the arm rotates out of the set range, such that the arm rotates only within the set angle range.

As a result, the apparatus for sensing a fuel level may be configured so that the defective rate caused by a function of rotating the arm only within the set range even though the residual amount of fuel is a reference value or more or a reference value or less can be lowered.

DETAILED DESCRIPTION OF MAIN ELEMENTS

Figure 1:
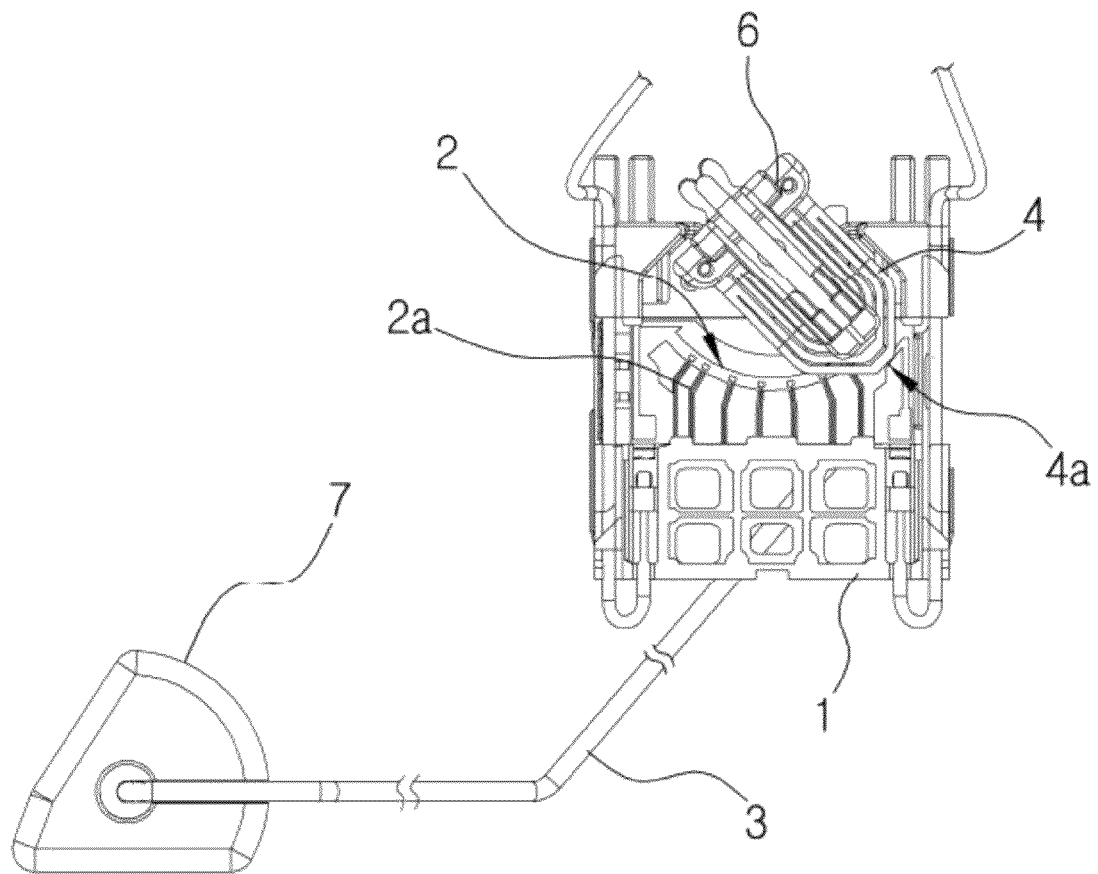
FIG. 1 is a schematic diagram for explaining a mechanical apparatus for sensing a fuel level according to the related art.
Figure 2:
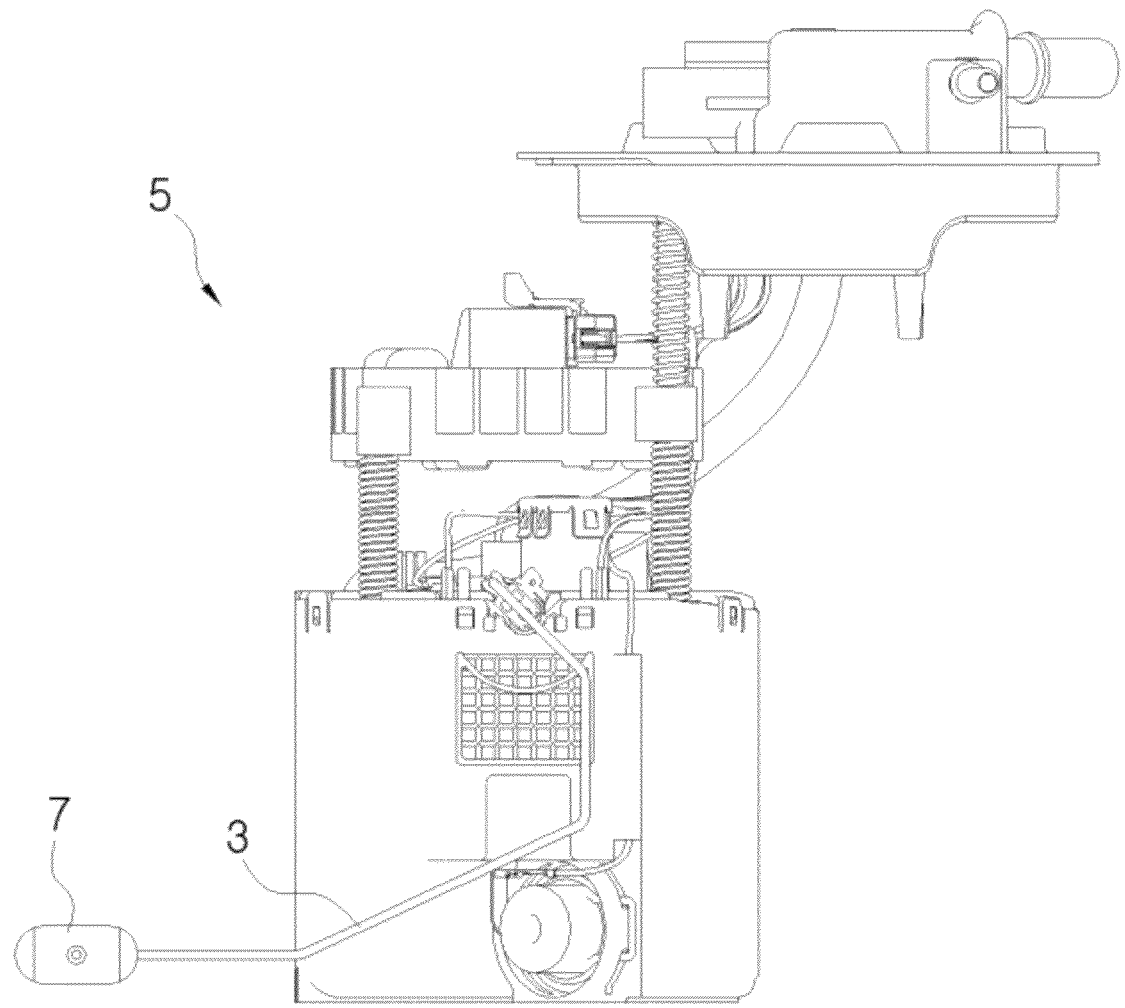
FIG. 2 is a schematic diagram for explaining the mechanical apparatus for sensing a fuel level mounted in a fuel pump module according to the related art.
Figure 3:
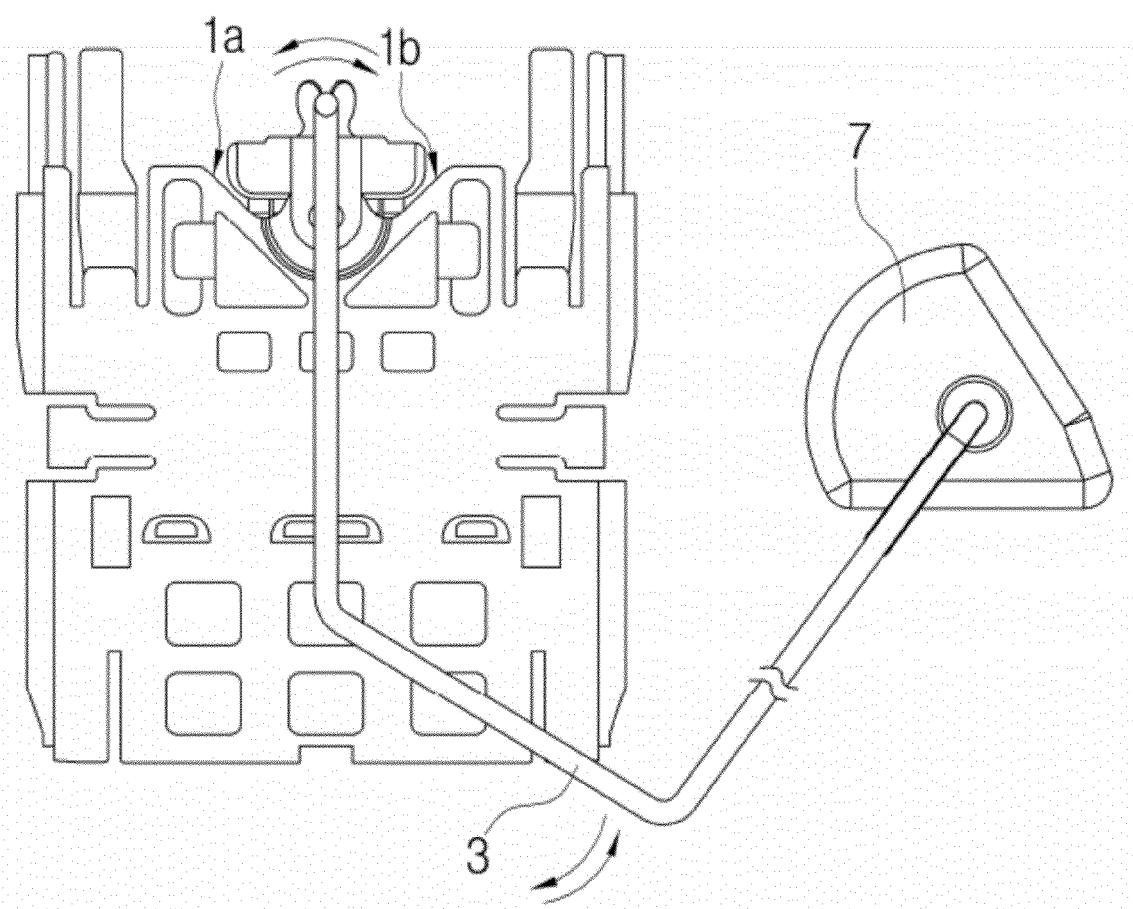
FIG. 3 is a schematic diagram for explaining a configuration in which an arm mounted in the mechanical apparatus for sensing a fuel level according to the related art rotates only within a set angle.
Figure 4:
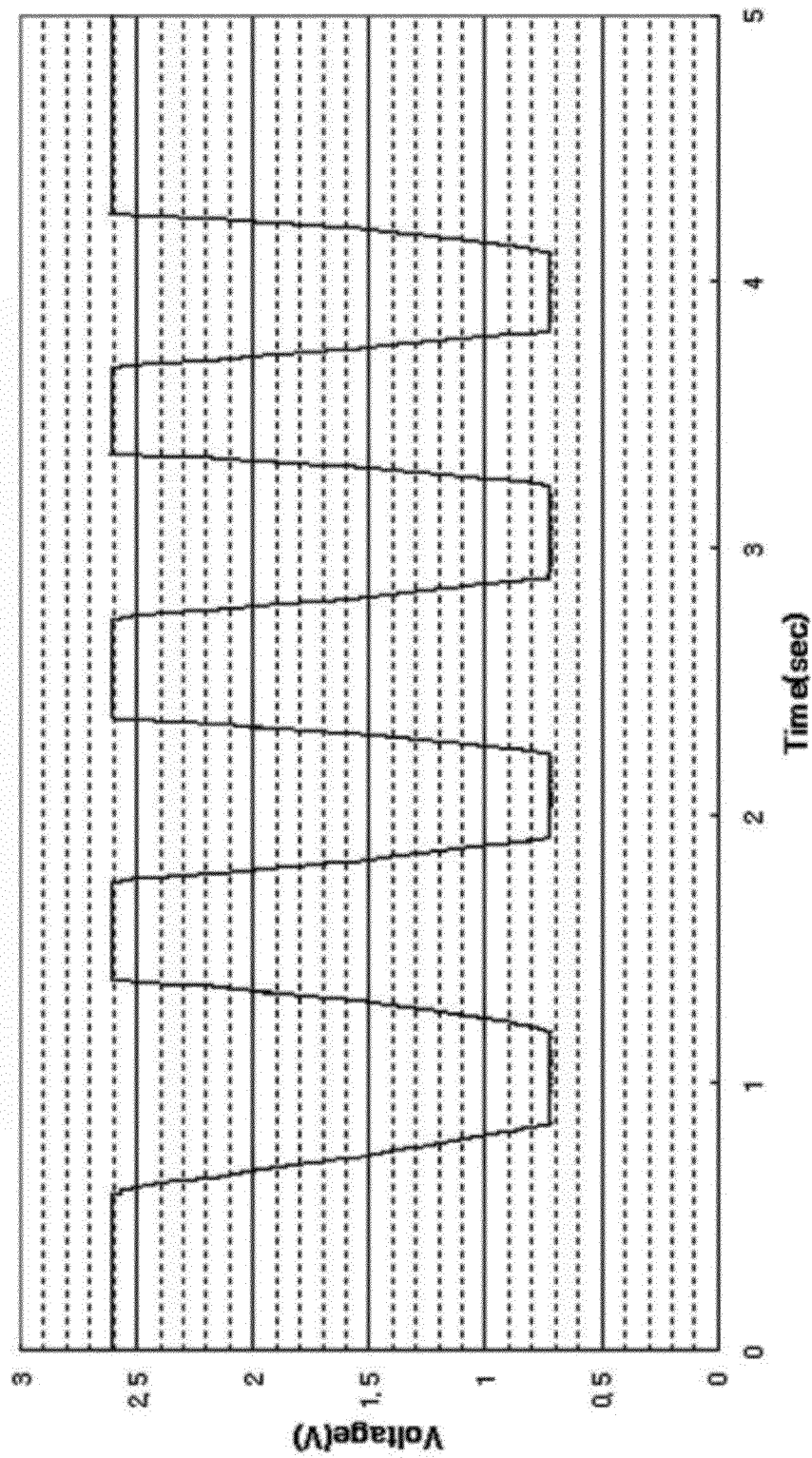
FIG. 4 is an image showing a signal when the apparatus for sensing a fuel level according to the related art using a filling solution is used at normal temperature.

1. CASE
1A. FIRST ROTATION PREVENTION PART
1B. SECOND ROTATION PREVENTION PART
2. RESISTANCE SUBSTRATE
2A. RADIATION CIRCUIT
3. ARM
4. WIRE
4A. CONTACT PROJECTION
5. FUEL PUMP MODULE
6. WIPER FIXTURE
7. FLOATER
10. CASE
10A. BASE BODY
10B. COVER
11. FILLING SOLUTION FILLING SPACE
11A. TOP FILLING SOLUTION POSITION SPACE
11B. BOTTOM FILLING SOLUTION POSITION SPACE
12. FILLING SOLUTION INLET
13A, 13B. ROTATION PREVENTION PROJECTION
20. RESISTANCE SUBSTRATE
30. ARM
40. WIPER

50. STOPPER
60. ARM INSTALLATION ROTATOR
70. FLOATER

DETAILED DESCRIPTION OF EMBODIMENTS

Hereinafter, a technical idea of the present invention will be described in more detail with reference to the accompanying drawings.

However, the accompanying drawings are only examples shown in order to describe the technical idea of the present invention in more detail. Therefore, the technical idea of the present invention is not limited to shapes of the accompanying drawings.

The present invention relates to an apparatus for sensing a fuel level mounted in the fuel tank, and more particularly, to an apparatus for sensing a fuel level for sensing a residual amount of fuel in the fuel tank by contacting a resistance substrate with and a wiper.

That is, the present invention relates to a mechanical apparatus for sensing a fuel level having the resistance substrate and the wiper.

Therefore, the apparatus for sensing a fuel level according to the present invention has general components mounted in the mechanical apparatus for sensing a fuel level according to the related art, such as a resistance substrate 20 and a wiper 40 according to the related art.

The mechanical apparatus for sensing a fuel level has been prevalently used in advance and therefore, a detailed description of the general components such as the resistance substrate 20, the wiper 40, or the like, will be omitted.

However, an object of the present invention is to prevent an abrasion phenomenon and a corrosion phenomenon due to a friction of the resistance substrate 20 and the wiper 40 using a filling solution.

Therefore, the apparatus for sensing a fuel level according to the present invention has a case 10 in which a sealable filling solution filling space 11 is formed.

Further, the filling solution having an anti-rusting and lubricating function is filled in the filling solution filling space 11.

Further, the resistance substrate 20 and the wiper 40 are disposed in the filling solution filling space 11.

As described above, a technology of disposing the resistance substrate 20 and the wiper 40 in the filling solution filling space 11 is known in Korean Patent No. 0712605 issued to the applicant of the present invention, or the like, as described in the related art.

The problems of the related art described above are that the defective rate is increased due to the difficulty in confirming whether the filling solution filling space 11 is sealed.

Therefore, an object of the present invention is to lower the defective rate by easily confirming the sealing state of the filling solution filling space 11.

In the related art, the reason why it is difficult to confirm the sealing state of the filling solution filling space is that the case 1 forming the filling solution filling space is configured to have a base body and a cover and a packing is disposed between the base body and the cover so as to maintain a sealing state, when considering the resistance substrate 2 and the wiper 4 that are to be disposed in the filling solution filling space.

That is, there is a need to confirm the sealing state of the filling solution filling space formed by coupling the base body, the packing, and the cover. However, a method of confirming the coupling state of the base body, the packing, and the cover has not yet been present (the inventors of the subject application proposes a method of forming the filling solution filling space 11 by fusing the base body 10a and the cover 10b made of a synthetic resin material in forming the filling solution filling space 11. In this case, there is a need to confirm whether the filling solution filling space 11 is sealed by firmly fusing the base body 10a and the cover 10b.

The inventors of the subject application proposes a configuration of easily confirm whether the filling solution filling space 11 is sealed by forming a filling solution inlet 12 on a top of the case 10 forming the filling solution filling space 11.

By the above configuration, it can be confirmed whether the filling solution filling space 11 is sealed by blowing compressed air in the filling solution filling space 11 through the filling solution inlet 12 while preventing the compressed air from being leaked through the filling solution inlet 12 when the compressed air is supplied to the filling solution filling space 11 (it can be more easily confirmed whether the filling solution filling space 11 is sealed by a method of confirming whether a pressure of the filling solution filling space is maintained to a set value or more when a predetermined amount of compressed air blows in the filling solution filling space 11).

Meanwhile, the present invention has a stopper 50 that blocks the filling solution inlet 12 so as to maintain the filling solution filling space 11 in a sealed state since it has the above-mentioned filling solution inlet 12.

The reason for forming the above-mentioned filling solution inlet 12 on the top of the case 10 is to minimize the leakage of the filling solution to the outside even though the defects such as incomplete blocking of the filling solution inlet 12 occur despite of blocking the filling solution inlet 12 using the stopper 50.

Further, it is more preferable to dispose the filling solution inlet 12 at a higher position than the resistance substrate 20 and the wiper 40 disposed in the filling solution filling space 11.

The stopper 50 is press-fitted in the filling solution inlet 12 to block the filling solution filling space 11. Alternatively, the stopper 50 is fused to the filling solution inlet 12 to block the filling solution filling space 11.

Meanwhile, the present invention uses the filling solution disposed at a lower position than the fuel in the fuel tank without mixing with the fuel in the fuel tank when the filling solution and the fuel in the fuel tank are disposed in the same space so as to prevent the resistance substrate 20 and the wiper 40 from contacting with the fuel even though the fuel in the fuel tank is introduced into the filling solution inlet 12 due to the reason of incomplete sealing between the stopper and the filling solution inlet 12, or the like, thereby preventing the abrasion phenomenon and the corrosion phenomenon.

As a method of disposing the filling solution at a lower position than the fuel in the fuel tank without mixing the filling solution having the fuel in the fuel tank when the filling solution and the fuel in the fuel tank are disposed in the same space, there is a method of using the filling solution having higher density than the fuel in the fuel tank.

In the present invention, it is preferable to use the filling solution that does not form an oil film between the resistance substrate 20 and the wiper 40 under the condition of about 30° C. below zero.

Figure 5:
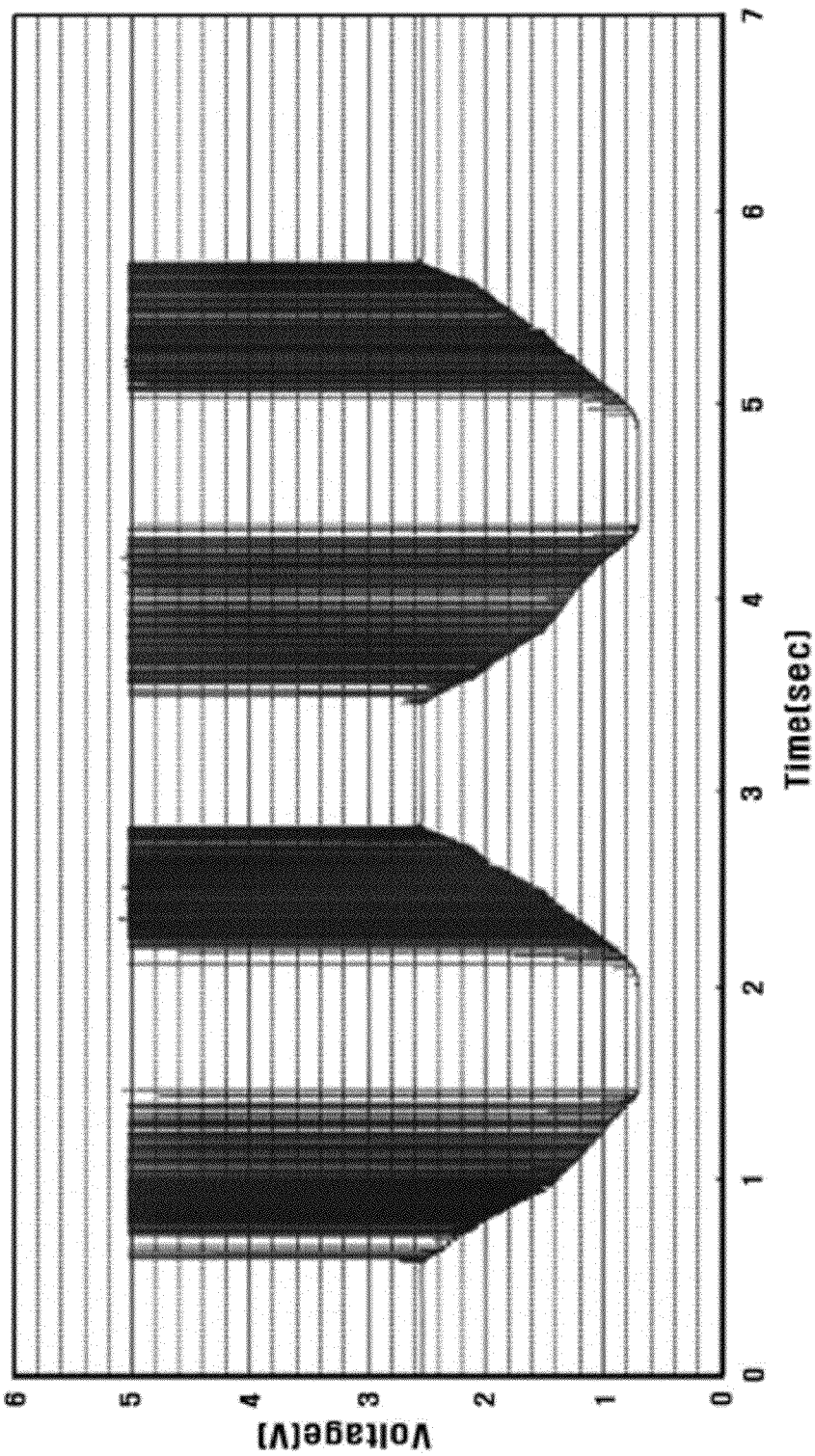
FIG. 5 is an image showing a signal when the apparatus for sensing a fuel level according to the related art using a filling solution is used at low temperature of about 30° C. below zero.
Figure 6:
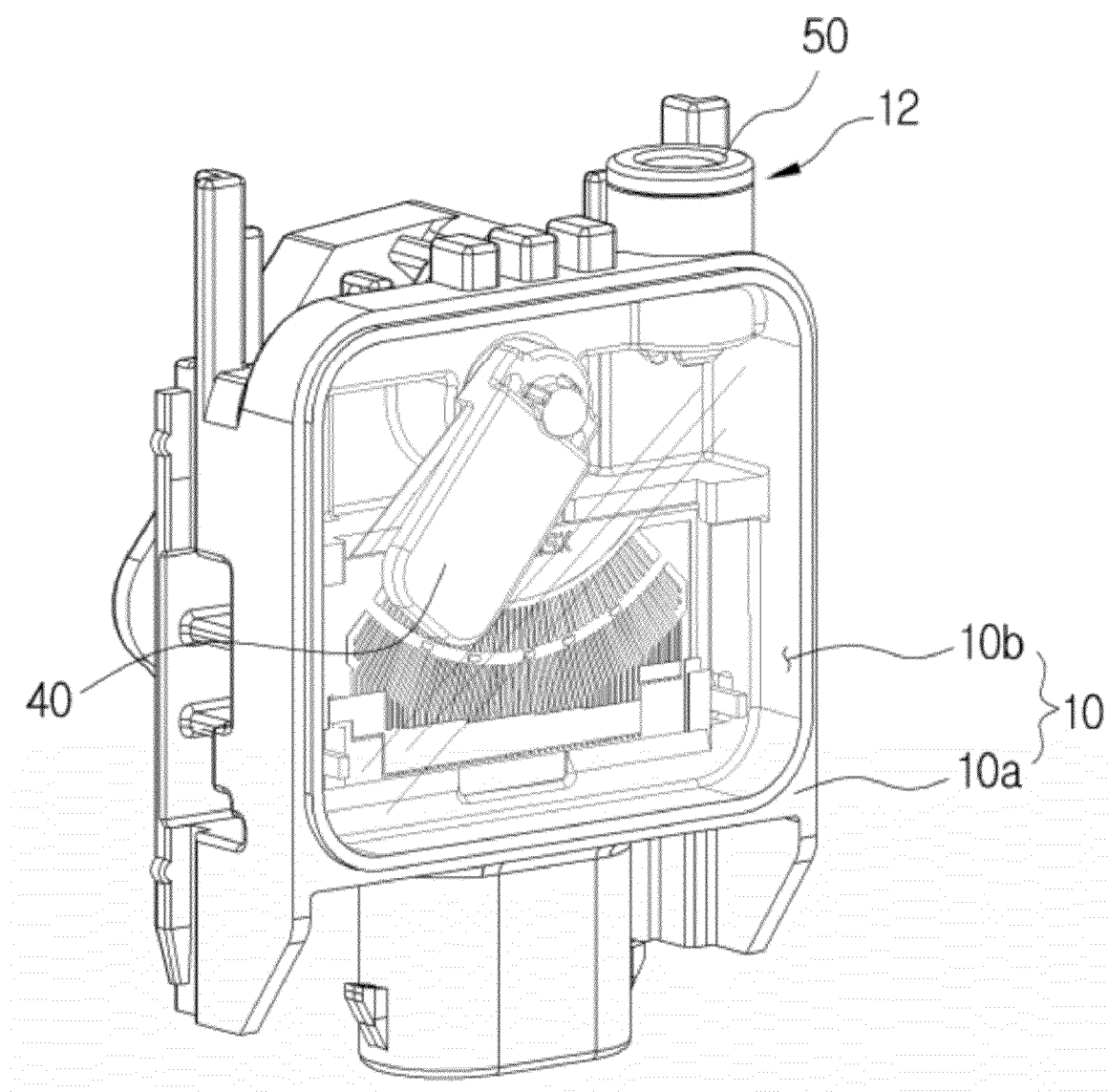
FIG. 6 is a schematic diagram showing an apparatus for sensing a fuel level according to the present invention.
Figure 7:
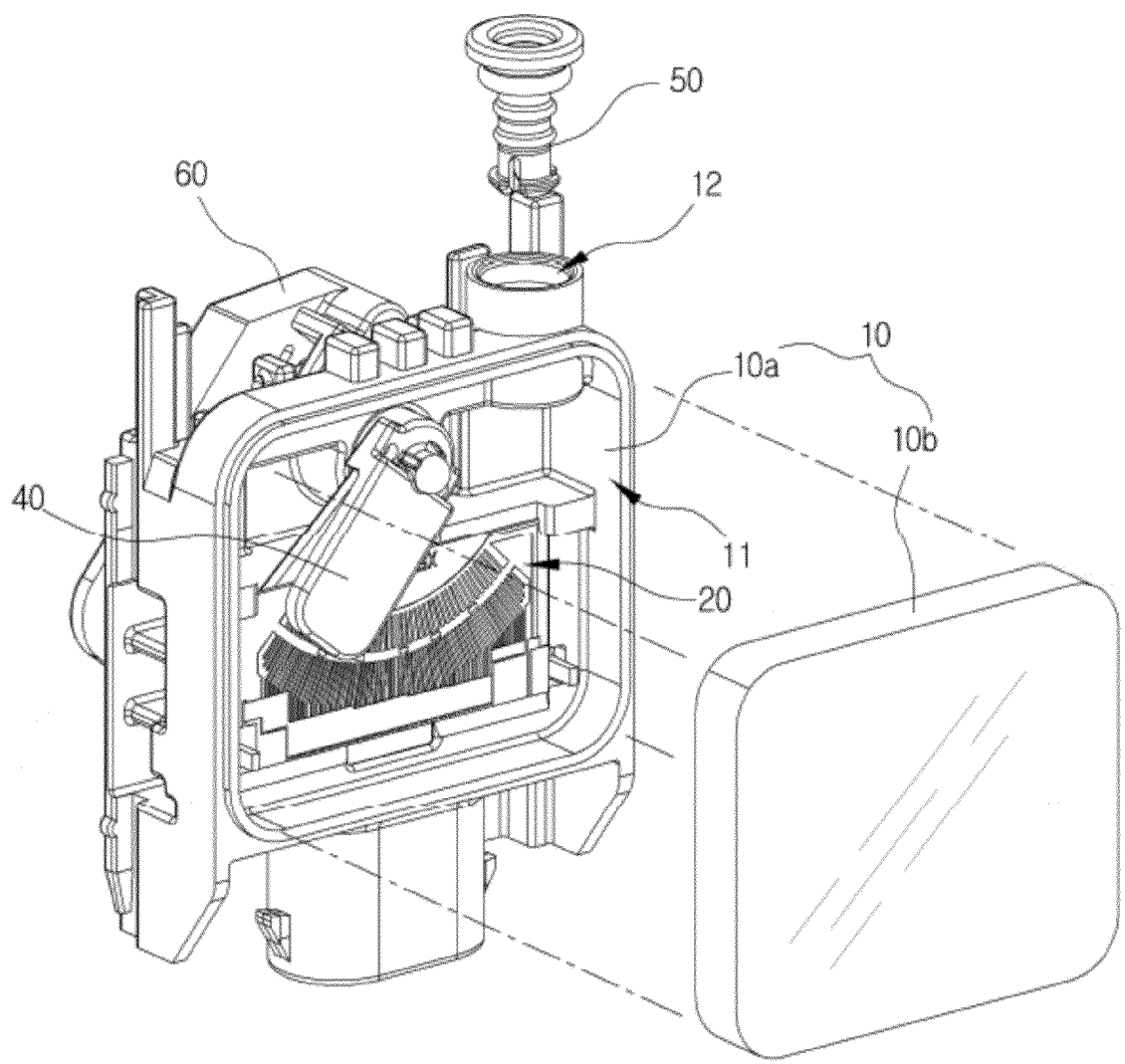
FIG. 7 is a partially exploded perspective view for explaining a case configured to have a base body and a cover, which is a component of the apparatus for sensing a fuel level according to the present invention.
Figure 8:
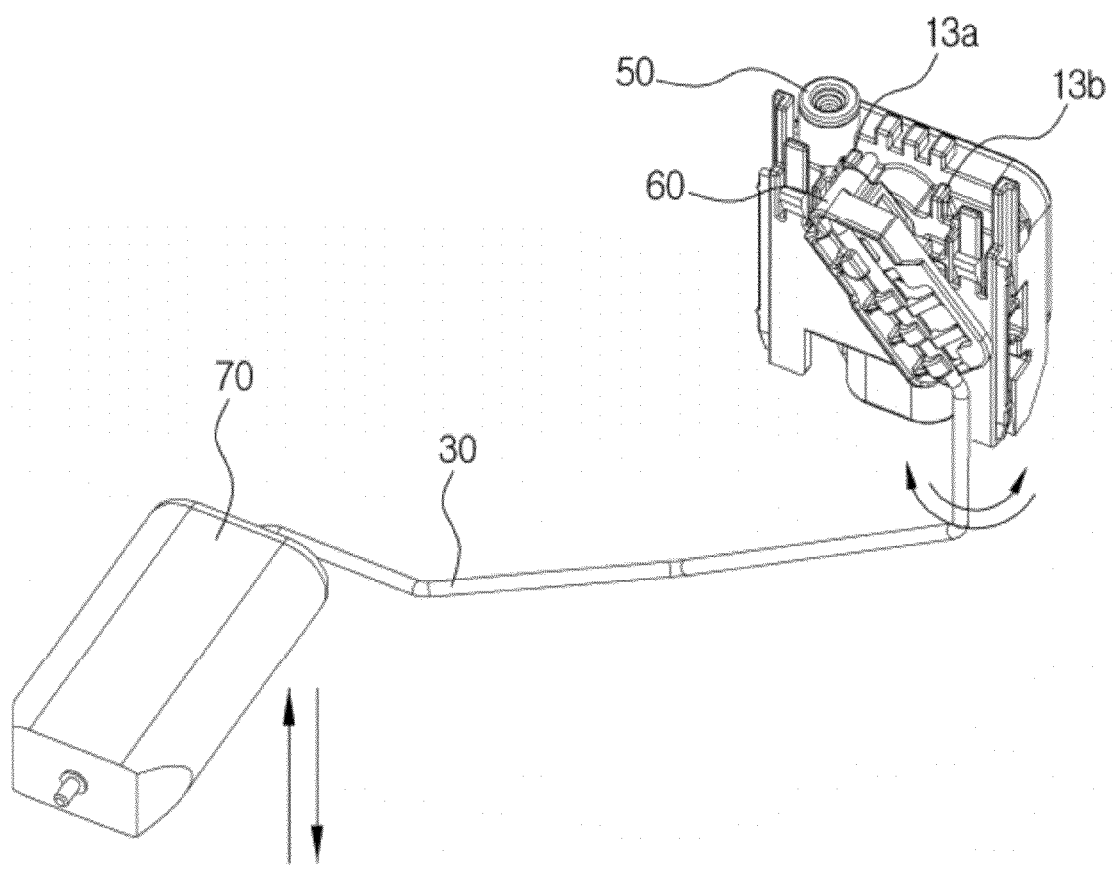
FIG. 8 is a schematic diagram for explaining a configuration in which the arm in the apparatus for sensing a fuel level according to the present invention rotates within a set range.
Figure 9:
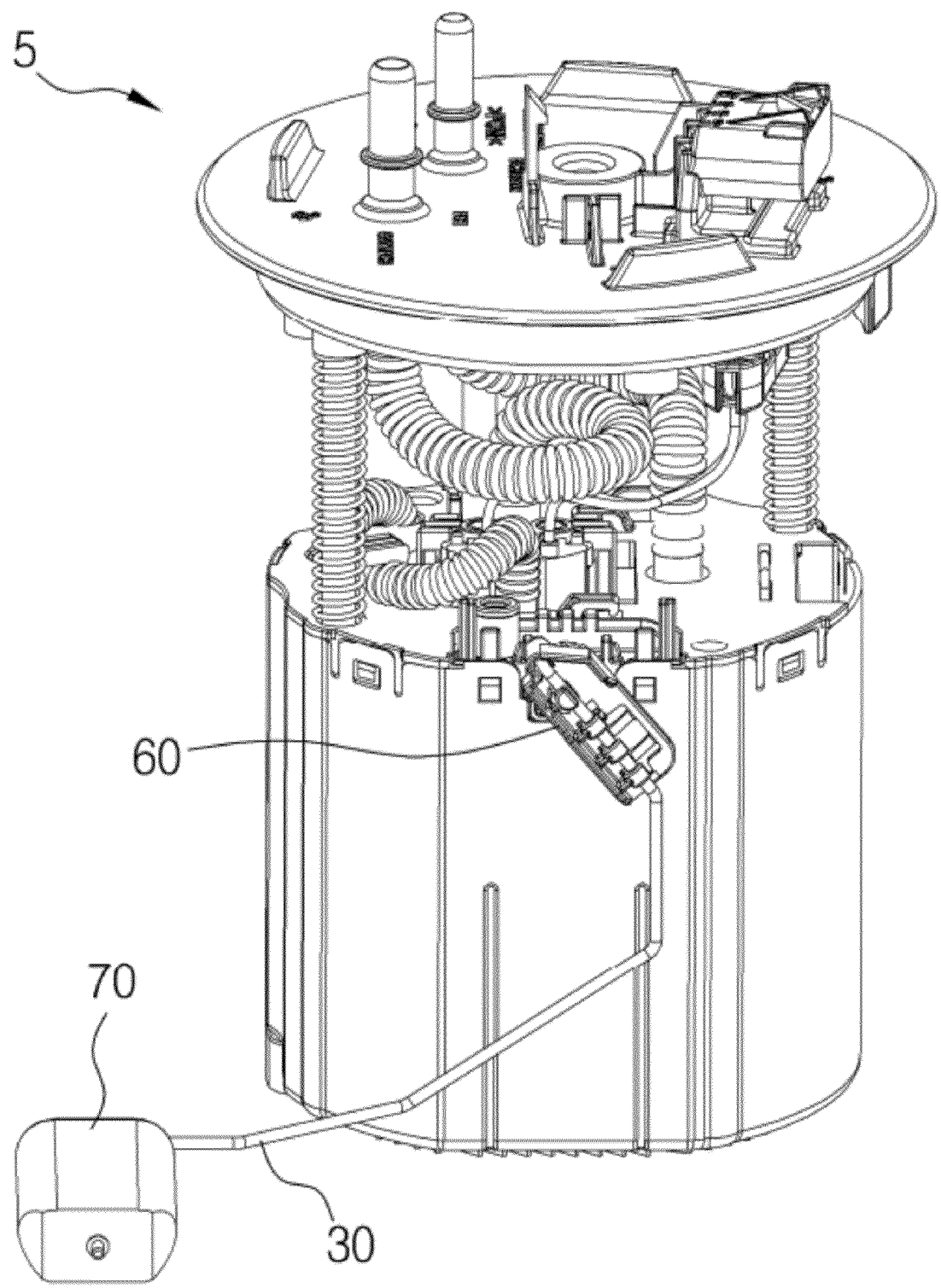
FIG. 9 is a schematic diagram showing a state in which the apparatus for sensing a fuel level according to the present invention is mounted in a fuel pump module.

This result has been obtained through trial and error and research of the inventors of the subject application. When the filling solution having the anti-rusting and lubricating function and a higher freezing point is used, the oil film is formed between the resistance substrate 20 and the wiper 40 due to the rising of the viscosity of the filling solution, such that the residual amount of fuel cannot be smoothly sensed (see FIG. 5).

Figure 10:
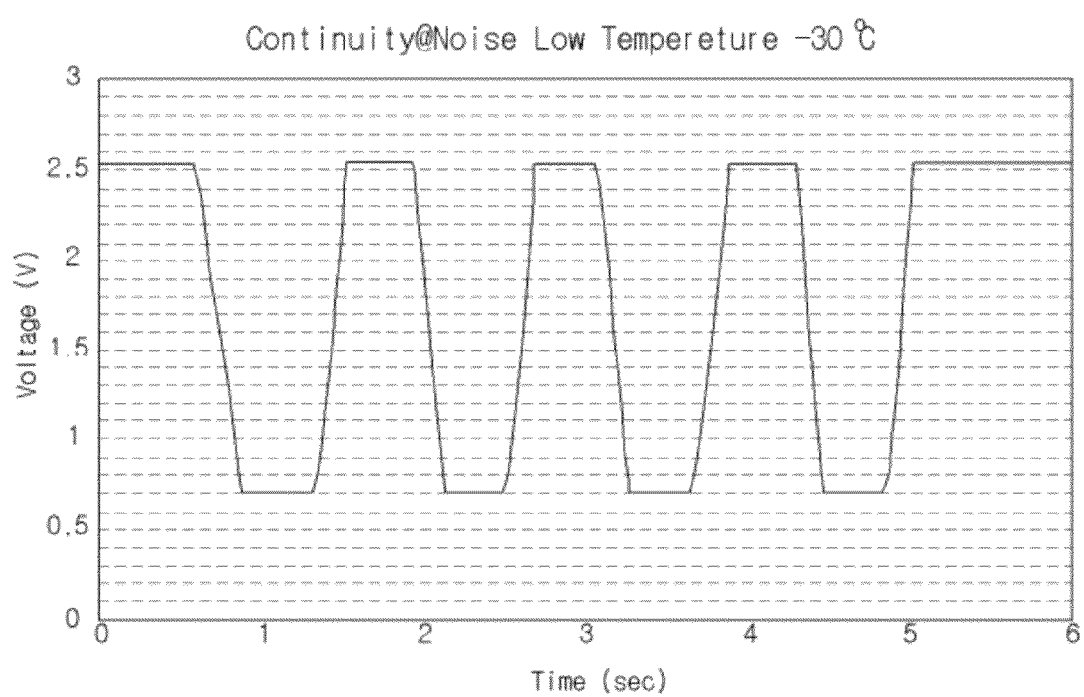
FIG. 10 is an image showing a signal when the apparatus for sensing a fuel level according to the present invention is used at low temperature of about 30° C. below zero.

According to various experiment results, the filling solution that does not form the oil film between the resistance substrate 20 and the wiper 40 under the condition of about 30° C. below zero has a slight difference from country to country, but in most cases, can obtain a satisfactory effect at the time of sensing the residual amount of fuel (see FIG. 10).

That is, the residual amount of fuel is relatively smoothly sensed.

The apparatus for sensing a fuel level according to the present invention may be configured to have a floater 70 floating in the fuel in the fuel tank and an arm 30 connected to the floater 70 and rotating the wiper while rotating according to the movement of the floater 70.

In this case, the arm 30 rotates only within the set angle like the related art, such that the arm 30 rotates only within the set range even though the residual amount of fuel is a reference value or more or a reference value or less.

However, as in the related art, when the method of preventing the arm 3 from rotating above the predetermined angle due to the contact of the wiper fixture 6 rotating together with the arm while being fixed to the arm 3 and the case 1 forming the space in which the filling solution is filled is used, the defective rate caused by the function of rotating the arm 30 only within the set range may be increased.

In order to prevent the problem, the arm 30 of the present invention is made of a metal material and the arm rotates only within the set angle range by hanging the arm 30 of the metal material onto the case 10 to prevent the arm from rotating when the arm 30 rotates out of the set range, such that the arm 30 may rotate only within the set angle range.

That is, the numerical change of the metal is small but the change in a size of a product manufactured by an injection molding is increased, such that it is difficult to obtain the uniform products.

Therefore, when the arm 30 rotates only within the set range by using a contact between an injection molded products, the defective rate is increased due to the increased deviation in a dimension; however, when the arm 30 made of metal and the injection molded product, that is, the case 10 are used, the defective rate may be relatively reduced (the reason is that the size of the manufactured arm 30 is relatively uniform).

In the accompanying drawings, a plurality of rotation prevention projections 13a and 13b protruded at a predetermined distance are formed in the case 10.

Further, when the arm 30 rotates by the movement of the floater 70, the arm 30 rotates only until it is hung onto the rotation prevention projections 13a and 13b, such that the arm 30 rotates only between the rotation prevention projections 13a and 13b.

The configuration is a very preferable structure capable of further lowering the defective rate caused by the rotation of the arm 30 only within the set range.

Figure 11:
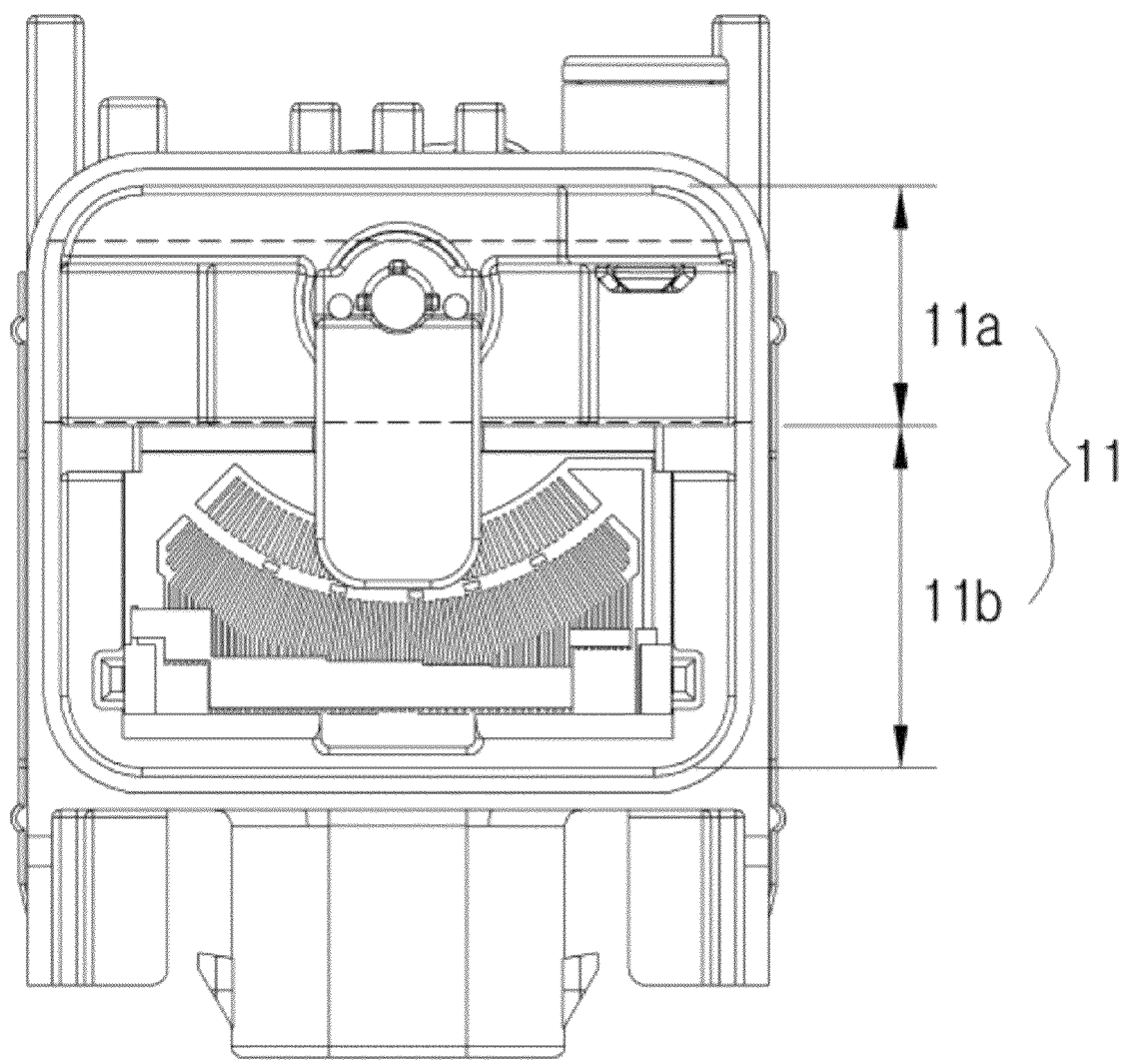
FIG. 11 is a schematic diagram for explaining a state in which a top filling solution and a bottom filling solution is divided and filled in the filling solution filling space according to the present invention.

In the present invention, as shown in FIG. 11, a kind of the filling solution filled in the filling solution filling space 11 may be various.

In this case, various kinds of filling solution may be implemented in a phase separation type.

Being described in detail, the filling solution is divided into a top filling solution and a bottom filling solution that are each filled in the top and bottom of the filling solution filling space 11, wherein the bottom filling solution has a higher density than the top filling solution, surrounds the wiper 40 and the resistance substrate 20, and does not form the oil film between the resistance substrate 20 and the wiper 40 under the condition of about 30° C. below zero while performing the anti-rusting and lubricating function and the top filling solution contacts the sealing part so as to block the arm 30 and the filling solution filling space 11 from the outside to perform the lubricating function.

That is, since the bottom filling solution contacts the wiper 40 and the resistance substrate 20, the filling solution having anti-rusting, lubricating, and low-temperature driving characteristics is used and since the top filling solution contacts the arm 30 and the sealing part, the filling solution increasing the sealing efficiency by making the lubrication and the phase separation from the fuel in the fuel tank more smooth is used.

Unexplained reference numeral 11a is a top filling solution position space, unexplained reference numeral 11b is a bottom filling solution position space, and an unexplained reference numeral 60 is an arm installation rotator that is rotatably mounted in the case 10 so as to rotate the arm 30 and has the arm 30 fixed thereto.

As set forth above, the apparatus for sensing a fuel level of the present invention can prevent the abrasion phenomenon and the corrosion phenomenon due to the friction of the resistance substrate and the wiper by disposing the resistance substrate and the wiper in the space in which the filling solution having the anti-rusting and lubricating function are filled and lower the defective rate by easily confirming whether the filling solution filling space is sealed using the method of blowing the compressed air in the filling solution inlet which is disposed on the top of the case so as to inject the filling solution into the sealable filling solution filling space.

Further, the present invention can prevent the abrasion phenomenon and the corrosion phenomenon even though the fuel in the fuel tank is introduced into the filling solution filling space when the filling solution is disposed at a position lower than the fuel in the fuel tank, without mixing with the fuel in the fuel tank when the filling solution filled preventing the abrasion and the corrosion and the fuel in the fuel tank are disposed in the same space.

In addition, the present invention can smoothly sense the reaming amount of fuel event at the low temperature of about 30° C. below zero when the filling solution not forming the oil film between the resistance substrate and the wiper even under the condition of 30° C. below zero is used (see FIG. 10).

Further, the apparatus for sensing a fuel level according to the present invention includes a floater floating in the fuel in the fuel tank and the arm connected to the floater to rotate the wiper while rotating according to the movement of the floater, in which the arm rotates only within the set angle range, the arm is made of a metal material, the arm rotates only within the set angle range by hanging the arm of the metal material onto the case to prevent the arm from rotating when the arm rotates out of the set range, such that the defective rate caused by the function of rotating the arm only within the set range can be lowered.

The present invention is not limited to the above-mentioned embodiments but may be variously applied, and may be variously modified without departing from the gist of the present invention claimed in the following claims.

What is claimed is:

1. An apparatus for sensing a fuel level, adapted to sense a residual amount of fuel in a fuel tank by contacting a resistance substrate with a wiper, the apparatus comprising:
   a case that forms a sealable filling solution filling space therein and includes a base body, having an open part formed on one side thereof, and a cover coupled to the open part of the base body to seal the filling solution filling space in a first direction;
   a filling solution inlet that is formed on a top surface of the base body and extends in a second direction that is substantially perpendicular to the first direction, the filling solution inlet having an opening area smaller than an opening area of the open part of the case;

a stopper that is coupled to the filling solution inlet and blocks the filling solution inlet to seal the filling solution filling space in the second direction; and a filling solution that is filled in the filling solution filling space to perform an anti-rusting and lubricating function, the filling solution being injected into the filling solution filling space through the filling solution inlet, wherein the resistance substrate and the wiper are disposed in the filling solution filling space, and wherein the filling solution inlet is disposed at a higher position than the resistance substrate and the wiper disposed in the filling solution filling space when installing the apparatus for sensing the fuel level.

2. The apparatus of claim 1, wherein when the filling solution and the fuel in the fuel tank are disposed in the same space, the filling solution is disposed at a lower position than the fuel in the fuel tank without mixing with the fuel in the fuel tank.

3. The apparatus of claim 1, wherein the filling solution does not form an oil film between the resistance substrate and the wiper under a condition of about 30° C. below zero temperature.

4. The apparatus of claim 1, wherein the filling solution is divided into a top filling solution and a bottom filling solution that are each disposed at top and bottom portions of the filling solution filling space, wherein the bottom filling solution has a higher density than the top filling solution, surrounds the wiper and the resistance substrate, and does not form an oil film between the resistance substrate and the wiper under a condition of about 30° C. below zero temperature while performing the anti-rusting and lubricating function, and the top filling solution contacts the stopper so as to block the filling solution filling space from an outside to perform the lubricating function.

5. The apparatus of claim 4, further comprising:
a floater floating the fuel in the fuel tank; and
an arm connected to the floater and made of a metal material rotating the wiper while rotating according to a movement of the floater,
wherein the arm rotates only within a set angle range by hanging the arm of the metal material onto the case to prevent the arm from rotating when the arm rotates out of the set angle range, such that the arm rotates only within the set angle range.

6. The apparatus of claim 1, further comprising:
a floater floating the fuel in the fuel tank; and
an arm connected to the floater and made of a metal material rotating the wiper while rotating according to a movement of the floater,
wherein the arm rotates only within a set angle range by hanging the arm of the metal material onto the case to prevent the arm from rotating when the arm rotates out of the set angle range, such that the arm rotates only within the set angle range.

7. The apparatus of claim 6, wherein a plurality of rotation prevention projections protruded at a predetermined distance are formed on the case, and
when the arm rotates by the movement of the floater, the arm rotates only until it is hung onto the rotation prevention projections, such that the arm rotates only between the rotation prevention projections.

\* \* \* \* \*